US009529676B1

United States Patent
Robins et al.

(10) Patent No.: US 9,529,676 B1
(45) Date of Patent: Dec. 27, 2016

(54) OPTIMIZING SPARE CAPACITY AND SPARE DISTRIBUTION

(71) Applicant: EMC IP Holding Company LLC, Hopkinton, MA (US)

(72) Inventors: Edward S. Robins, Winchester, MA (US); Evgeny Malkevich, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/587,371

(22) Filed: Dec. 31, 2014

(51) Int. Cl.
   *G06F 11/10* (2006.01)
   *G06F 3/06* (2006.01)

(52) U.S. Cl.
   CPC ......... *G06F 11/1096* (2013.01); *G06F 3/0608* (2013.01); *G06F 3/0644* (2013.01); *G06F 3/0689* (2013.01)

(58) Field of Classification Search
   CPC .............. G06F 11/1076; G06F 11/1008; G06F 2211/1057; G06F 11/1096; G06F 3/0608; G06F 3/0644; G06F 3/0689; G11B 20/1833
   See application file for complete search history.

(56) References Cited

U.S. PATENT DOCUMENTS

| | | | | |
|---|---|---|---|---|
| 6,851,070 B1* | 2/2005 | Rodrigues | ............. | G06F 11/008 711/114 |
| 6,851,082 B1* | 2/2005 | Corbett | ............... | G06F 11/1088 711/112 |
| 7,080,278 B1* | 7/2006 | Kleiman | ............. | G06F 11/1076 714/6.24 |
| 7,346,831 B1* | 3/2008 | Corbett | ............... | G06F 11/1076 714/5.11 |
| 7,467,329 B1* | 12/2008 | Keeton | ................. | G06F 11/008 714/15 |
| 7,536,585 B1* | 5/2009 | Keeton | ................. | G06F 11/008 714/33 |
| 7,644,046 B1* | 1/2010 | Keeton | ............... | G06F 11/3409 705/1.1 |
| 8,725,986 B1* | 5/2014 | Goel | ................... | G06F 12/0223 711/114 |
| 2003/0126522 A1* | 7/2003 | English | ............... | G06F 11/1076 714/718 |
| 2003/0126523 A1* | 7/2003 | Corbett | ............... | G06F 11/1076 714/718 |
| 2007/0136525 A1* | 6/2007 | Read | ................... | G06F 11/1076 711/114 |

(Continued)

*Primary Examiner* — Esaw Abraham
*Assistant Examiner* — Kyle Vallecillo
(74) *Attorney, Agent, or Firm* — Muirhead and Saturnelli, LLC

(57) ABSTRACT

Configuring spare sections in a system having a plurality of devices and having a plurality of erasure encoding groups, each of the devices having a plurality of sections and each of the groups having a plurality of members located on the sections of the devices, includes configuring the system to have a plurality of erasure encoding groups with no spare sections, ordering the groups according to desirability of converting members of each of the groups into spare sections, converting members of a subset of the groups into spare sections according to ordering of the groups, and determining if the spare sections for the system provide sufficient coverage for the system in response to failure of each of the devices. The erasure encoding may be a RAID encoding.

18 Claims, 7 Drawing Sheets

(56) References Cited

U.S. PATENT DOCUMENTS

2011/0010599 A1\* 1/2011 Goel ................... G06F 11/1076
714/752
2011/0138391 A1\* 6/2011 Cho ...................... G06F 9/4881
718/102

\* cited by examiner

FIG. 7

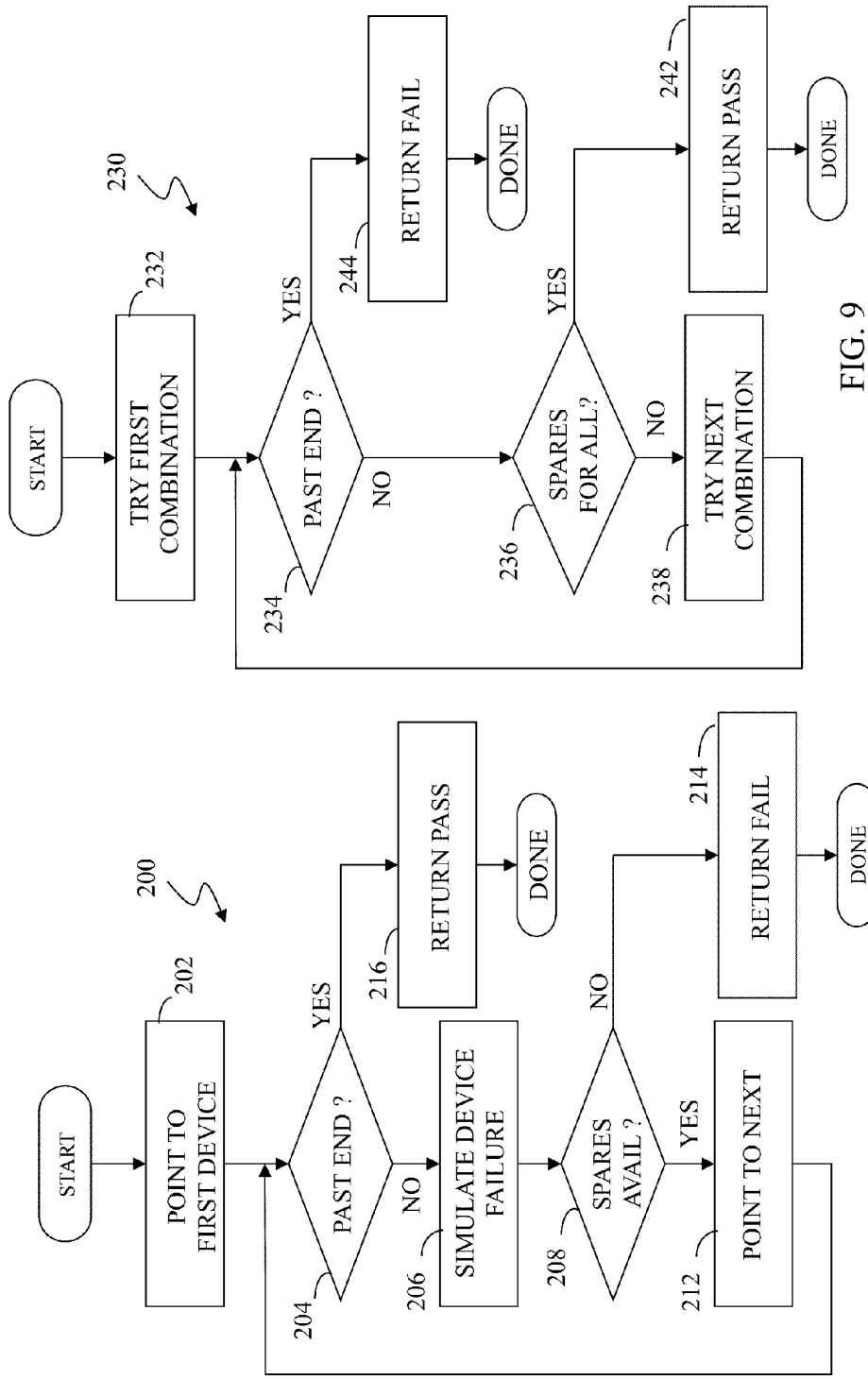

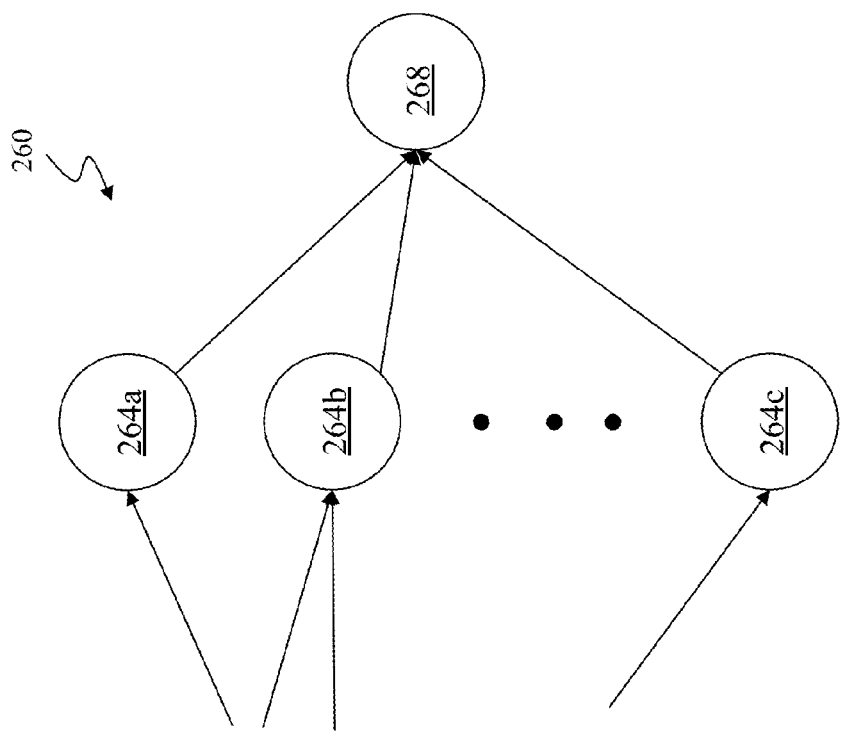
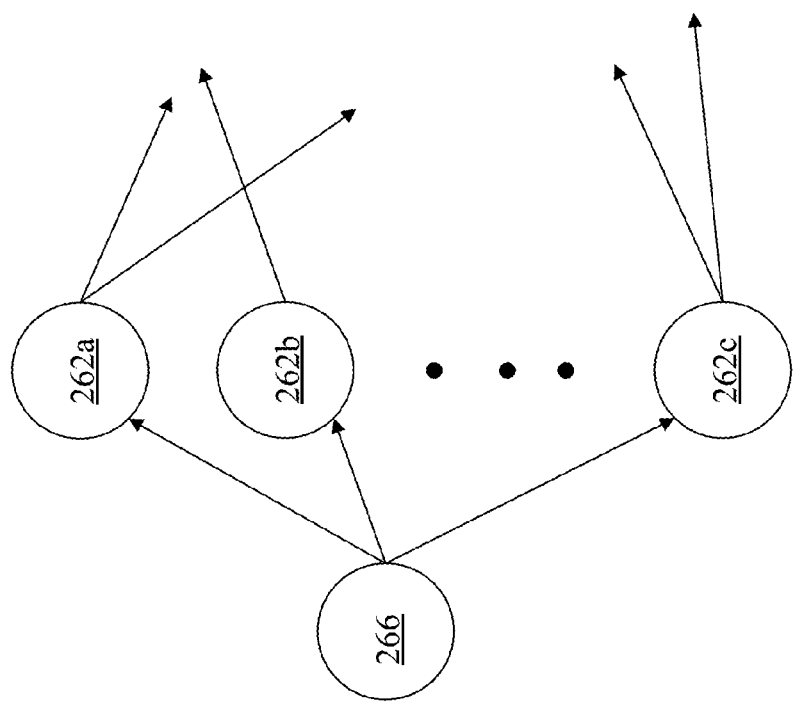
FIG. 10

OPTIMIZING SPARE CAPACITY AND SPARE DISTRIBUTION

BACKGROUND OF THE INVENTION

1. Technical Field

This application relates to computing devices, and more particularly to the field of managing storage for computing devices.

2. Description of Related Art

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In some cases, it may be desirable to use erasure encoding to protect logical volumes in case one or more of the disk drives fails. Some types of erasure encoding, such as RAID encoding, provide for having multiple members on different physical devices. Depending on the type of RAID encoding, data may be protected from one or more physical drive faults. For example, RAID 1 provides for two members, where each member is a mirror of the other. If the members are located on different physical devices, then, when one of the physical devices fails, the other may be used for accessing the data. In addition, the RAID 1 configuration may be reconstructed using the remaining, non-failing device and a new device to which the data may be copied. After all of the data has been copied to the new device, the data is once again protected by the RAID 1 configuration.

Physical devices of a storage system may be subdivided into multiple sections where each section is used for storing a member of a RAID group. For example, a first physical device may be subdivided into three sections, the first section containing a RAID 1 member of RAID group A, the second section containing a RAID 1 member of RAID group B, and the third section containing a RAID 1 member of RAID group C. A second physical device may be similarly subdivided to provide a corresponding other member of each of the RAID 1 groups. Note, however, that if one of the physical devices fails, the three RAID groups will need to be reconstructed by accessing the remaining, non-failed, physical device, which may significantly slow down the reconstruction process. To address this, RAID groups may be distributed among a plurality of physical devices in a way that minimizes the number of occurrences of members of different RAID groups on the same physical device. For example, members of the RAID groups may be distributed so that only one physical device, at most, contains both a member of the RAID group A and a member of the RAID group B. Note also that, to facilitate protection from device failure, no more than one member of a particular RAID group may be provided on the same physical device.

In addition to considerations for distributing RAID group members among different sections of physical devices, it is also necessary to consider the number and placement of spare sections that may be used to reconstruct RAID group(s) following failure of a physical device. If a physical device having Q RAID group members fails, it is desirable to have available at least Q spare sections for reconstructing the RAID groups to restore RAID protection for the groups. One way to do this is to provide an extra physical device having only spare sections that may be used for reconstructing RAID groups when another physical device fails. However, this provides that all of the RAID groups affected by the failure would be reconstructed using the extra physical device at the same time following the failure, which may be less than optimal. Accordingly, the spare sections may be distributed among the physical devices, which addresses the issue of reconstructing all of the RAID groups to the same physical device, but may add complexity in terms of determining the number of spare sections needed to provide coverage for all of the RAID groups. Note that simply providing Q spare sections may not be sufficient because of other constraints, such as not having more than one member from the same RAID group on the same physical device and possibly other constraints/criteria. Of course, additional criteria/constraints may be addressed by significantly overprovisioning spare sections, but this may not be an acceptable solution where it is desirable to have a maximum number of useable RAID groups while still maintaining complete spare coverage for the groups to protect against failure of any of the physical devices.

Accordingly, it is desirable to provide a mechanism for provisioning spare sections for RAID groups in a way that allows all of the RAID groups to be reconstructed according to criteria for RAID group member placement without overprovisioning spare sections.

SUMMARY OF THE INVENTION

According to the system described herein, configuring spare sections in a system having a plurality of devices and having a plurality of erasure encoding groups, each of the devices having a plurality of sections and each of the groups having a plurality of members located on the sections of the devices, includes configuring the system to have a plurality of erasure encoding groups with no spare sections, ordering the groups according to desirability of converting members of each of the groups into spare sections, converting members of a subset of the groups into spare sections according to ordering of the groups, and determining if the spare sections for the system provide sufficient coverage for the system in response to failure of each of the devices. Determining if the spare sections provide sufficient coverage may include determining if each of the erasure encoding groups can be reconstructed using the spare sections following a failure of each of the devices. For each of the groups, the desirability of converting members thereof may be determined according to a total collision count that corresponds to a weighted sum of collision counts between each of the groups and each other ones of the groups. The weighting function may be provided by:

$$w(c_{ij}) = (\max - c_{ij})^2$$

where $c_{ij}$ is a collision count between erasure coding group i and erasure coding group j and max is a maximum value of the collision count for all of the erasure groups. The total collision count may be provided by:

$$TCC_i = \sum_{j=1}^{NEG} w(c_{ij}) c_{ij}$$

where NEG is a total number of erasure groups. Ordering the groups may include providing a list of groups in order according to the total collision count. Determining if the spare sections for the system provide sufficient coverage may include simulating failure of each of the devices. Determining if the spare sections for the system provide sufficient coverage may include trying different combinations of spare assignments and, in response to a combination that does not work, choosing a next combination that swaps two of the spare assignments. Determining if the spare sections for the system provide sufficient coverage may include using an Edmonds-Karp technique. The erasure coding may be RAID erasure coding.

According further to the system described herein, a non-transitory computer-readable medium contains software that configures spare sections in a system having a plurality of devices and having a plurality of erasure encoding groups, each of the devices having a plurality of sections and each of the groups having a plurality of members located on the sections of the devices. The software includes executable code that configures the system to have a plurality of erasure encoding groups with no spare sections, executable code that orders the groups according to desirability of converting members of each of the groups into spare sections, executable code that converts members of a subset of the groups into spare sections according to ordering of the group, and executable code that determines if the spare sections for the system provide sufficient coverage for the system in response to failure of each of the devices. Executable code that determines if the spare sections provide sufficient coverage may determine if each of the erasure encoding groups can be reconstructed using the spare sections following a failure of each of the devices. For each of the groups, the desirability of converting members thereof may be determined according to a total collision count that corresponds to a weighted sum of collision counts between each of the groups and each other ones of the groups. The weighting function may be provided by:

$$w(c_{ij}) = (\max - c_{ij})^2$$

where $c_{ij}$ is a collision count between erasure coding group i and erasure coding group j and max is a maximum value of the collision count for all of the erasure groups. The total collision count may be provided by:

$$TCC_i = \Sigma_{j=1}^{NEG} w(c_{ij}) c_{ij}$$

where NEG is a total number of erasure groups. Executable code that orders the groups may provide a list of groups in order according to the total collision count. Executable code that determines if the spare sections for the system provide sufficient coverage may simulate failure of each of the devices. Executable code that determines if the spare sections for the system provide sufficient coverage may try different combinations of spare assignments and, in response to a combination that does not work, choose a next combination that swaps two of the spare assignments. Executable code that determines if the spare sections for the system provide sufficient coverage may use an Edmonds-Karp technique. The erasure coding may be RAID erasure coding.

BRIEF DESCRIPTION OF DRAWINGS

Embodiments of the system described herein are explained with reference to the several figures of the drawings, which are briefly described as follows.

FIG. 7 is a diagram illustrating forming a RAID collision matrix according to an embodiment of the system described herein.

FIG. 8 is a flow diagram illustrating simulating device failures in connection with determining sufficient spare coverage according to an embodiment of the system described herein.

FIG. 9 is a flow diagram illustrating trying different combinations of spare assignment in connection with determining if spare coverage is available according to an embodiment of the system described herein.

FIG. 10 is a diagram illustrating using flow theory to with determine if spare coverage is available according to an embodiment of the system described herein.

DETAILED DESCRIPTION OF VARIOUS EMBODIMENTS

Figure 1:
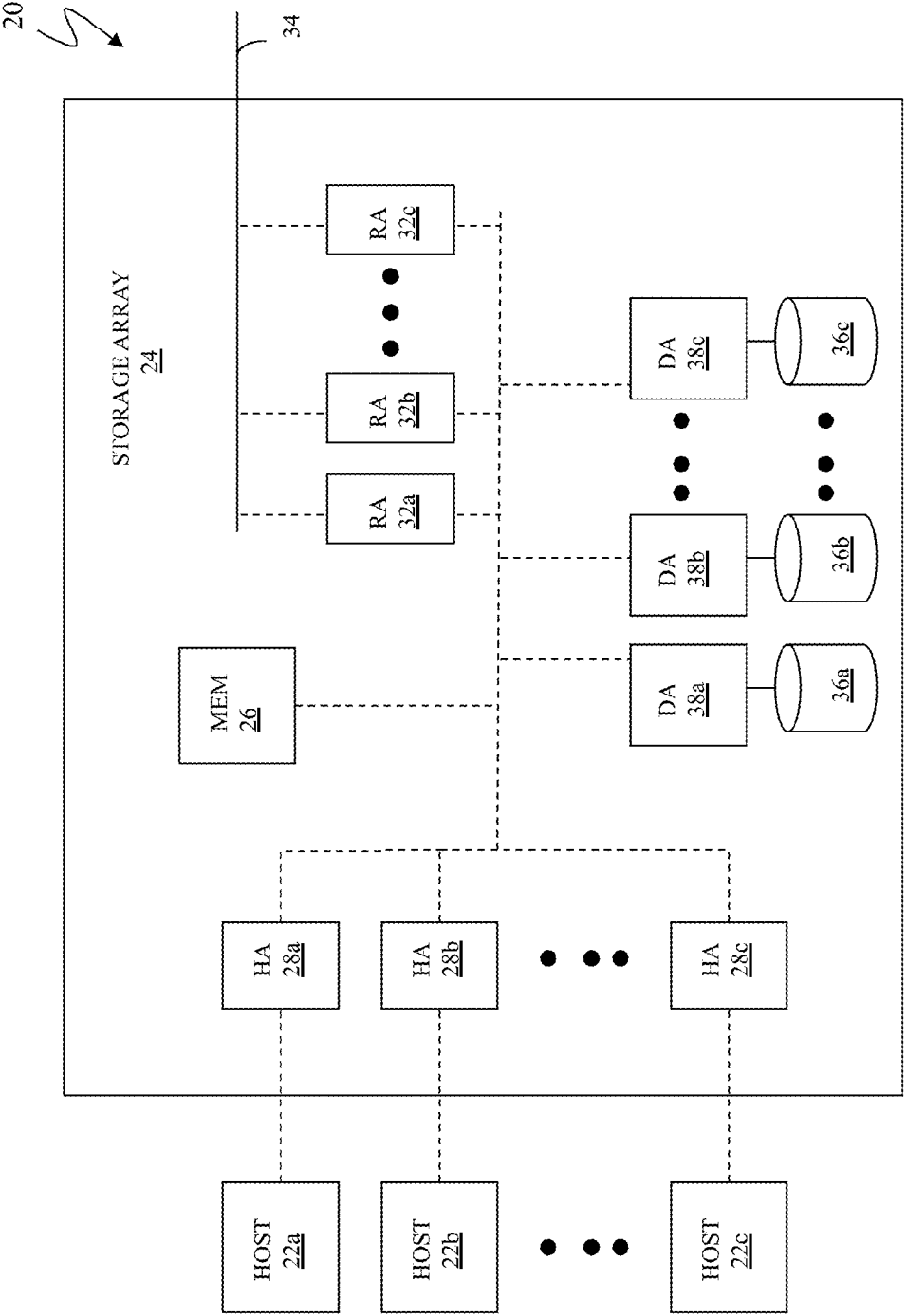
FIG. 1 is a diagram showing a plurality of hosts and a data storage device according to an embodiment of the system described herein.

Referring to FIG. 1, a diagram 20 shows a plurality of hosts 22a-22c coupled to a data storage array 24 that may be used in connection with an embodiment of the system described herein. Each of the hosts 22a-22c may all be located at the same physical site or may be located in different physical sites and may be coupled to the data storage array 24 using SCSI, Fibre Channel, iSCSI, and/or any other appropriate mechanism. The data storage array 24 includes a memory 26 that facilitates operation of the storage array 24, as further described elsewhere herein. The data storage array 24 also includes a plurality of host adapters (HA's) 28a-28c that handle reading and writing of data between the hosts 22a-22c and the storage array 24. Although the diagram 20 shows each of the hosts 22a-22c coupled to each of the HA's 28a-28c, it will be appreciated by one of ordinary skill in the art that one or more of the HA's 28a-28c may be coupled to other hosts. In various embodiments, the storage array 24 may be a Symmetrix storage device, a CLARiiON storage device and/or a VPLEX product produced by EMC Corporation of Hopkinton, Mass., although the system described herein may also operate in connection with any other suitable storage devices and products.

In an embodiment, the storage array 24 may include one or more Remote Data Facility (RDF) adapter units (RA's) 32a-32c. An RDF product produced by EMC Corporation, may be used to copy data from one storage array to another. For example, if a host writes data to a first storage array (e.g., a local storage array), it may be desirable to copy that data to a second storage array provided in a different location (e.g., a remote storage array). The RA's 32a-32c are coupled to an RDF link 40 and are similar to the HA's 28a-28c, but are used to transfer data between the storage array 24 and other storage arrays that are also coupled to the RDF link 40.

The storage array 24 may be coupled to additional RDF links (not shown) in addition to the RDF link 40. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The storage array 24 may also include one or more disks 36a-36c, each containing a different portion of data stored on the storage array 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage array 24 that corresponds to the disks 36a-36c may be subdivided into a plurality of volumes or logical devices. The logical storage space may also be merged in connection with use of a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage array 24 may be provided as a stand-alone device coupled to the hosts 22a-22c as shown in FIG. 1 or, alternatively, the storage array 24 may be part of, and/or otherwise coupled to, a storage area network (SAN) that may include a plurality of other storage arrays as well as switches, routers, network connections, etc., as further discussed elsewhere herein.

Figure 2:
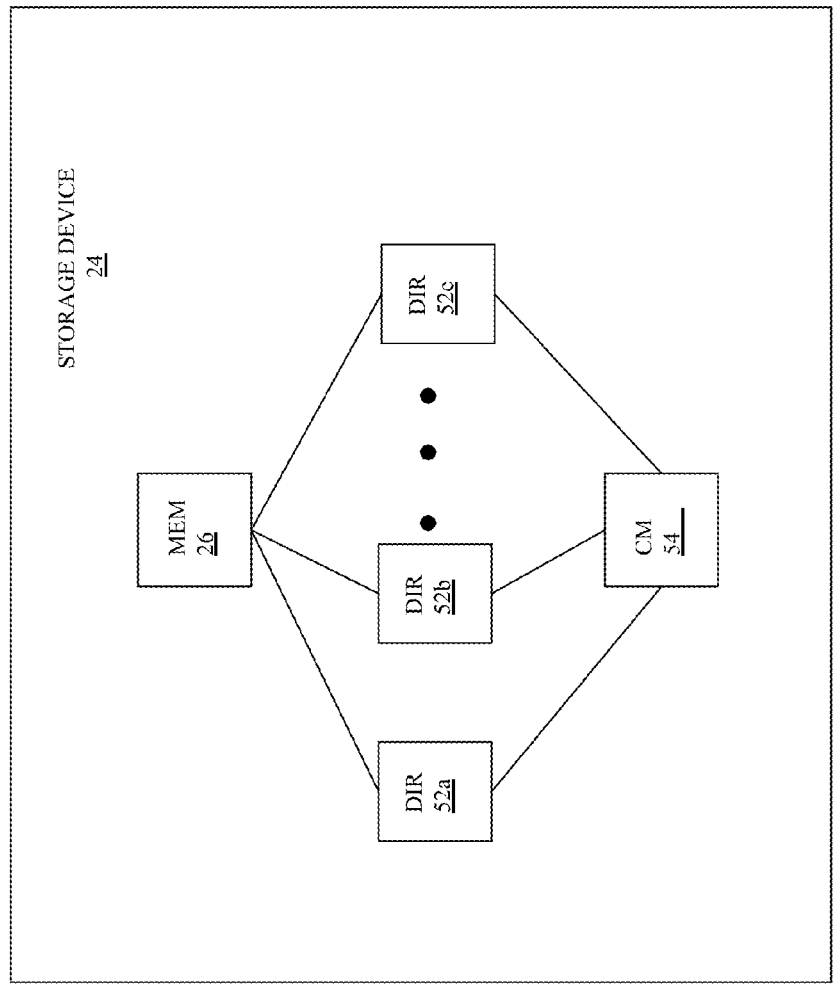
FIG. 2 is a diagram showing a storage device, memory, a plurality of directors, and a communication module according to an embodiment of the system described herein.

FIG. 2 is a schematic diagram 50 illustrating an embodiment of the storage array 24 where each of a plurality of directors 52a-52c are coupled to the memory 26. Each of the directors 52a-52c may represent one of the HA's 28a-28c, RA's 32a-32c, and/or DA's 38a-38c. In an embodiment herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In some cases, at least one of the directors 52a-52c may perform other functions such as data encryption and buffering and/or may host one or more virtual machines VMs) to provide this and possibly other functionality, including back end data organization. Relatively larger scale computational work may be distributed among one or more VMs throughout the storage array 24. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage array and accessible by each of the storage arrays.

Figures 3, 4:
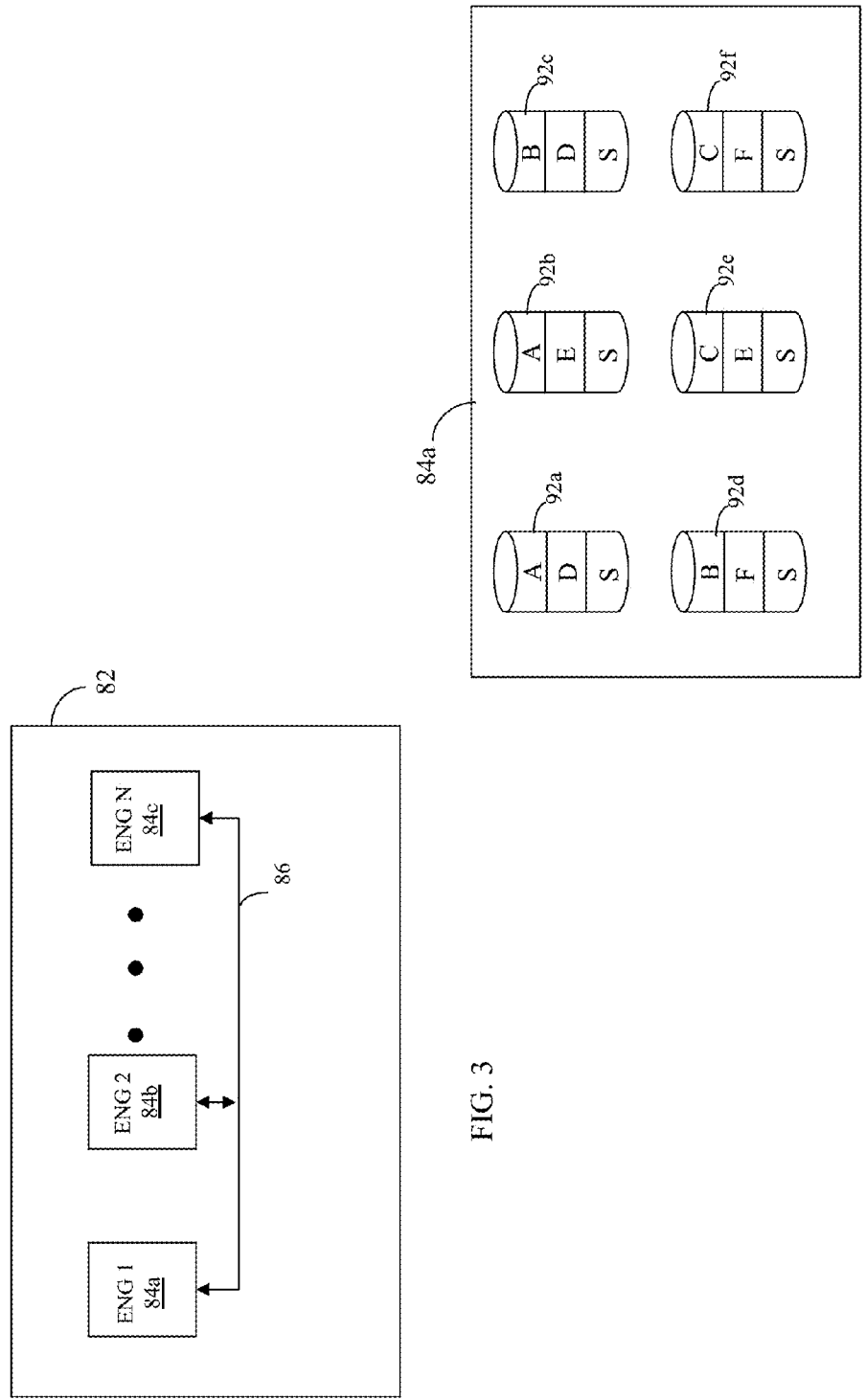
FIG. 3 is a diagram showing a storage device containing a plurality of engines according to an embodiment of the system described herein.
FIG. 4 is a diagram showing an engine of a storage device containing a plurality of subdivided physical devices according to an embodiment of the system described herein.

Referring to FIG. 3, a storage device 82 is shown as including a plurality of separate engines 84a-84c that are interconnected using an appropriate data fabric connection 86 that transmits data between the engines 84a-84c. Although only three are shown, the engines 84a-84c represent any number of engines. In an embodiment herein, each of the engines 84a-84c may include two directors, a global memory that is accessed directly by components of each of the engines 84a-84c, a plurality of disk drives that are accessed directly by components of each of the engines 84a-84c, and front end components (e.g., HAs) that are used to provide connectivity to host devices. Generally, each of the engines 84a-84c is a somewhat self-contained group of storage components that provide storage functionality to host devices independent of the other ones of the engines 84a-84c. In some instances, the data fabric connection 86 may be used to provide redundancy across engines by, for example, allowing mirroring of global memory and/or disk drives between two or more of the engines 84a-84c.

The system described herein provides RAID functionality and spare RAID storage within each of the engines 84a-84c. However, the system described herein is applicable to any multi-drive storage system. In addition, even though the system described herein is illustrated using RAID storage, the mechanisms described herein may be used in connection with any multi-device storage system wherein data is stored on multiple devices (e.g., disk drives, SSD drives, etc.) for redundancy and may be reconstructed after a disk failure using corresponding disks that have not failed.

Note that, although specific storage array configurations are disclosed in connection with FIGS. 1, 2 and 3, it should be understood that the system described herein may be implemented on any appropriate platform. Thus, the system described herein may be implemented using a platform like that described in connection with FIGS. 1, 2 and 3 or may be implemented using a platform that is somewhat or even completely different from any particular platform described herein.

There are a number of erasure codes that provide data redundancy, including various forms of RAID erasure coding, where data is placed on a number of different devices. For example, in the case of a RAID 1 mirror, the same data is written to two separate devices and, if one of the devices fails, data integrity is maintained by using the non-failing device. Other forms of RAID data protection exist, including more complicated forms that use data correction codes that store data and parity bits or bytes on more than two devices. In some cases, a data protection scheme may provide for failure of more than one device at the same time while still allowing data to be maintained. Also note that, in instances where a device fails, it is desirable to reconfigure (reconstruct) the erasure coding storage to correspond to the initial configuration. For example, in the case of a RAID 1 mirror where one of the devices fails, the RAID 1 configuration is reconstructed by copying data from the non-failing device to a new device. Once all the data has been copied, the RAID 1 configuration has been restored and data integrity is maintained.

In some systems, it is desirable to provided a cluster RAID configuration where each of the devices is subdivided into Q sections. Each of the sections may store a different part of a RAID configuration. In such a case, it is desirable that no more than one member of a RAID group (an erasure coding group) be placed on the same device. Thus, if there are R members for each RAID group, there must be at least R devices irrespective of the value of Q to ensure that each member of a RAID group is provided on a separate device.

Referring to FIG. 4, the engine 84a is shown as including a plurality of devices 92a-92f. Other components that may be present in the engine 84a (e.g., director boards, memory, etc.) are not shown in FIG. 4. The devices 92a-92f may be logical storage devices, physical storage devices, or some combination thereof. Each of the devices 92a-92f is subdivided into three sections to provide a cluster RAID configuration. In the example of FIG. 4, there are six volumes: A, B, C, D, E, and F that are protected using a RAID 1 configuration (mirror). Thus, for example, the A volume is provided on a section of the device 92a as well as on a section on the device 92b. The sections on the devices 92a, 92b are mirrors so that, for example, if the device 92a fails, all of the data for volume A is still accessible on the section of the device 92b that contains data for the volume A. Note that other erasure encodings, that use more members, are possible. For example, a RAID 5 configuration would have three or more members per volume instead of two as illustrated in FIG. 4, where at least one of the members provides parity information for the other members.

The sections labeled "S" are spare sections of the devices 92a-92f that do not (initially) contain any data, but are used for reconstructing the RAID configurations after failure of one or more of the devices 92a-92f. Of course, it is always possible to simply use the remaining section of a device after one of the devices fails without reconstructing the RAID configuration. Thus, for example, if the device 92a fails, it is possible to continue accessing the A volume via the device 92b alone and to continue accessing the D volume via the device 92c alone. Note, however, that if the RAID configurations for volumes A and D are not reconstructed following a failure of the device 92a, then volumes A and D are no longer protected and a subsequent failure of the device 92b will cause the volume A to be lost and a subsequent failure of the device 92c will cause the volume D to be lost. Accordingly, it is often the case that, following loss of a device in a data protection scheme, the data protection scheme is reestablished using the remaining devices. In the example provided herein, the RAID configurations for the volumes A and D would be reconstructed using the spare sections of some of the remaining devices 92b-92f.

As mentioned above, it is desirable that no portions of the same volume be on the same device. Thus, if the device 92a fails, the spare section of the device 92b will not be used to reconstruct the RAID 1 protection for volume A since that would put both mirrors for volume A on the single device 92b. Similarly, the device 92c would not be used to reconstruct the RAID 1 protection for the volume D. In addition, in some instances, the devices 92a-92f may be arranged in fault zones. For example, the engine 84a may have two power supplies, where one power supply provides power to the devices 92a, 92d, 92e while the other power supply provides power to the devices 92b, 92c, 92f. Note that, with such an arrangement, all of the volumes retain at least one mirror following failure of one of the power supplies. In an embodiment herein, it is desirable that, when selecting a spare for reconstructing a RAID arrangement, the spare is located in the same fault zone as the failed device.

Another useful property of a RAID system (or generally any erasure coding system) is that no more than one portion from each of two particular volumes (i.e., different data sets being protected) exist on more than one device. This property, called the "unity condition", is useful in connection with accessing devices for reconstructing RAID configurations following a failure. For example, portions of the volumes A and D are provided on the device 92a. If the device 92a fails, the RAID configuration for the volume A may be restored by copying data from the storage device 92b to a spare section while the RAID configuration for the volume D may be restored by copying data from the storage device 92c to a spare section. Note that, if mirror portions of A and D had been provided on the same storage device, then failure of the storage device 92a would require accessing that same device to reconstruct the RAID configurations for both the volume A and the volume D. Generally, it is desirable to maintain the unity condition, if possible. It may also be noted that none of the volumes shown in FIG. 4 share more than one of the drives 92a-92f, and thus the arrangement of FIG. 4 illustrates the unity condition. Note also that some of the volumes do not share any of the drives 92a-92f at all.

The system described herein provides an automated configuration mechanism to a number of spare sections for devices and RAID configurations that are significantly more complex than the system illustrated in FIG. 4. Generally, RAID members for as many RAID groups as possible are assigned to devices to provide a unity condition (or as close to a unity condition as possible, which may be arranged computationally) and then some of the RAID groups are converted so that members of the converted groups become spare sections so that if any device fails, there will be sufficient spare sections to reconstruct any RAID configuration affected by the device failure.

Figure 5:
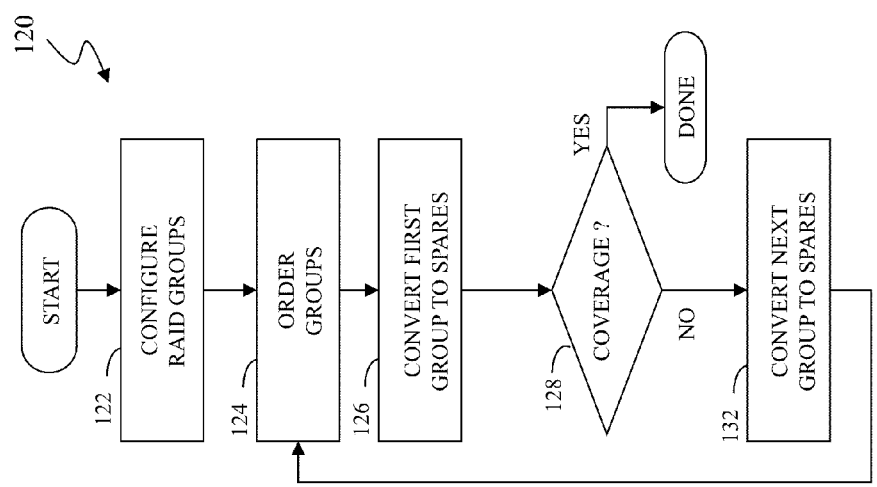
FIG. 5 is a flow diagram illustrating processing performed in connection with provisioning spare sections according to an embodiment of the system described herein.

Referring to FIG. 5, a flow diagram 120 illustrates processing performed in connection with configuring spare sections in a storage device. In an embodiment herein, it is desirable to configure a system to have the least number of spare sections while ensuring that if any of the devices fail, each of the RAID groups affected by the failure (i.e., having members on the failed device) may be reconstructed using available spare sections. Generally, the system is initially configured with no spare sections and then members of RAID groups are converted to spare sections one RAID group at a time until the desired end result is met (e.g., ensuring that if any of the RAID devices fail, each of the RAID groups may be reconstructed using available spare sections). The RAID groups are converted in a specific order, as described in more detail elsewhere herein.

Processing for the flow diagram 120 begins at a step 122 where RAID groups are configured for cluster RAID operations with Q sections per device. The configuration provided at the step 122 has no spare sections, but is arranged to provide the unity condition (described above) or possibly optimized (e.g., computationally) to approach the unity condition. In an embodiment herein, the configuration is provided at the step 122 using a mechanism described in U.S. patent application Ser. No. 14/231,282 filed on Mar. 31, 2014 and titled "ALLOCATING RAID STORAGE VOLUMES ACROSS A DISTRIBUTED NETWORK OF STORAGE ELEMENTS", which is incorporated by reference herein. Of course, other mechanisms may be used at the step 122 to initially allocate members of the RAID groups among sections of devices. In other embodiments, members of the RAID groups may be assigned by a random placement algorithm that may be constrained by rules such as those described herein.

Following the step 122 is a step 124 where the RAID groups are ordered based on desirability of converting members into spare sections. That is, the RAID groups are ordered so that the most desirable group to convert is first, the next most desirable group is second, etc. The ordering of the RAID groups may be provided on a list. Ordering the groups at the step 124 is described in more detail elsewhere herein. Following the step 124 is a step 126 where members of the first group on the list constructed at the step 124 are converted to spare sections. Following the step 126 is a test step 128 where it is determined if the system has sufficient coverage such that, if any one of the devices fails, all of the effected RAID groups can be reconstructed using available spare sections. Processing at the step 128 is described in more detail elsewhere herein.

If it is determined at the step 128 that sufficient coverage is provided by the number of spare sections in the system, then processing is complete. Otherwise, control transfers from the test step 128 to a step 132 where members of the next RAID group in the list constructed at the step 124 are converted to spare sections. Following the step 132, control transfers back to the step 128, discussed above, to determine again whether there is sufficient coverage. Thus, the steps 128, 132 are performed repeatedly until there is sufficient spare coverage.

Figure 6:
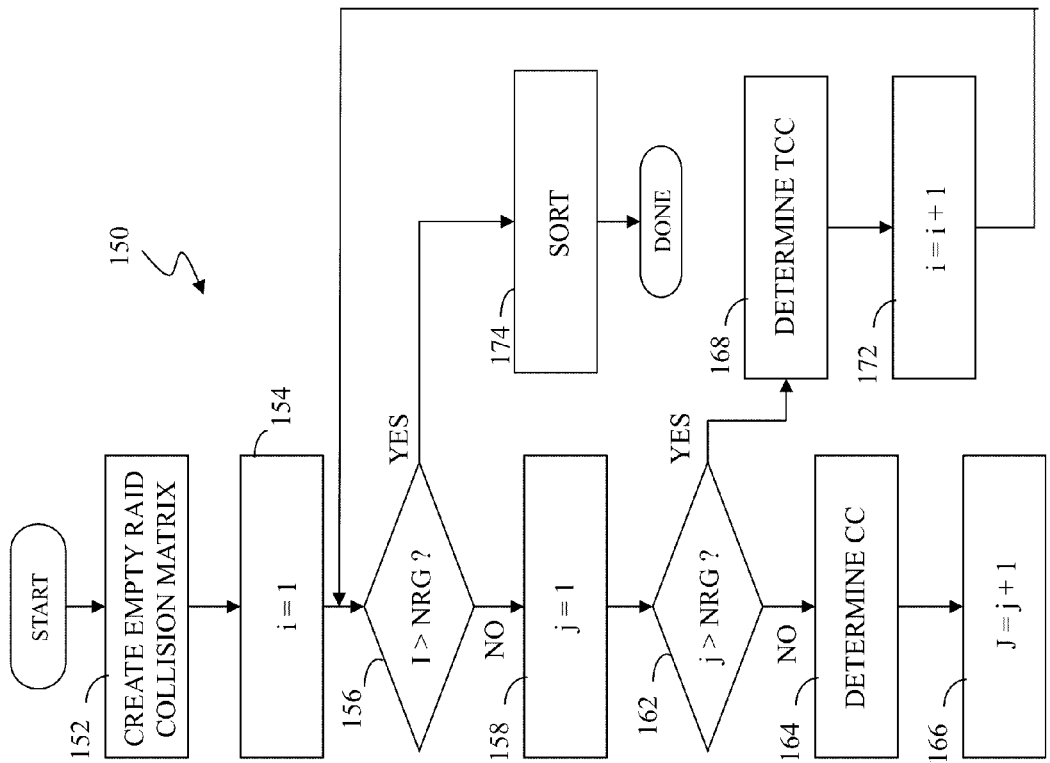
FIG. 6 is a flow diagram illustrating ordering RAID groups according to an embodiment of the system described herein.

Referring to FIG. 6, a flow diagram 150 illustrates in more detail processing performed in connection with the step 124, described above, where an ordered list of RAID groups is provided where the order is based on desirability of converting members of each group into spare sections. Processing begins at a step 152 where an empty table (RAID collision matrix) is created for facilitating follow on processing, described below. The RAID collision matrix created at the step 152 contains an indication of the number of devices on which at least one member of each pair of RAID groups both exist (collision count). That is, a value for the i, j element of the RAID collision matrix corresponds to the number of devices on which at least one member of RAID group i and RAID group j both exist. As described in more detail below, these values may be used to facilitate determining weighted values used to provide the ordered list.

Following the step 152 is a step 154 where an index variable, i, is initialized to one. The index variable i is one of two variable used to iterate through the RAID groups. Following the step 154 is a test step 156 where it is determined if the index variable i is greater than the number of RAID groups (NRG). If not, then control passes from the test step 156 to a step 158 where a second index variable, j, is initialized to one. The index variable j is the second one of two variable used to iterate through the RAID groups. Following the step 158 is a test step 162 where it is determined if the index variable j is greater than the number of RAID groups (NRG). If not, then control transfers from the test step 162 to a step 164 where a count is made of the number of times a member of RAID group i and a member of RAID group j are provided on different sections of the same device (e.g., the same disk drive). As mentioned elsewhere herein, ideally, the count is zero or one for all devices and RAID groups. However, practically, this number may exceed one in some cases. The count at the step 164 may be determined using any appropriate technique.

Following the step 164 is a step 166 where the index variable, j, is incremented. Thus, the step 164, 166 are repeated to determine the collision count values between RAID group i and all of the other RAID groups of the system. Following the step 166, control transfers back to the test step 162 to determine if the index variable, j, is greater than the number of RAID groups (i.e., if collision count between RAID group i and all of the other RAID groups has been determined). If it is determined at the test step 162 that j is greater than the number of RAID groups, then control transfers from the test step 162 to a step 168 where the total collision count (TCC) is determined for the RAID group i. In some embodiments, it is possible to determine TCC by simply summing of all of the collision counts for the RAID group i. In other embodiments, the values may be weighted non-linearly to emphasize or deemphasize different collision count values. In an embodiment herein, the weighting function is provided by the following:

$$w(c_{ij}) = (\max - c_{ij})^2$$

where $c_{ij}$ is the collision count between RAID group i and RAID group j and max is the maximum value of the collision count for all of the RAID groups. Of course, other appropriate weighting functions may be used.

At the step 168, the total collision count (TCC) is determined as follows:

$$TCC_i = \Sigma_{j=1}^{NEG} w(c_{ij}) c_{ij}$$

Following the step 168 is a step 172 where the index variable, i, is incremented. Following the step 172, control transfers back to the step 156, discussed above, for another iteration. If it is determined at the step 156 that the value of i is greater than the number of RAID groups (NRG), then control transfers from the test step 156 to a step 174 where a list is made by sorting all of the $TCC_i$ values is ascending order with the lowest value first, followed by the next lowest value, etc. In other embodiments, it is possible to make the list by sorting the TCCi values in descending order. In still other embodiments, the TCCi values may be sorted so that the median value is first, followed by the two higher and lower values that are adjacent to the median value, followed by the next two adjacent higher and lower values, etc. Following the step 174, processing is complete.

Figure 7:
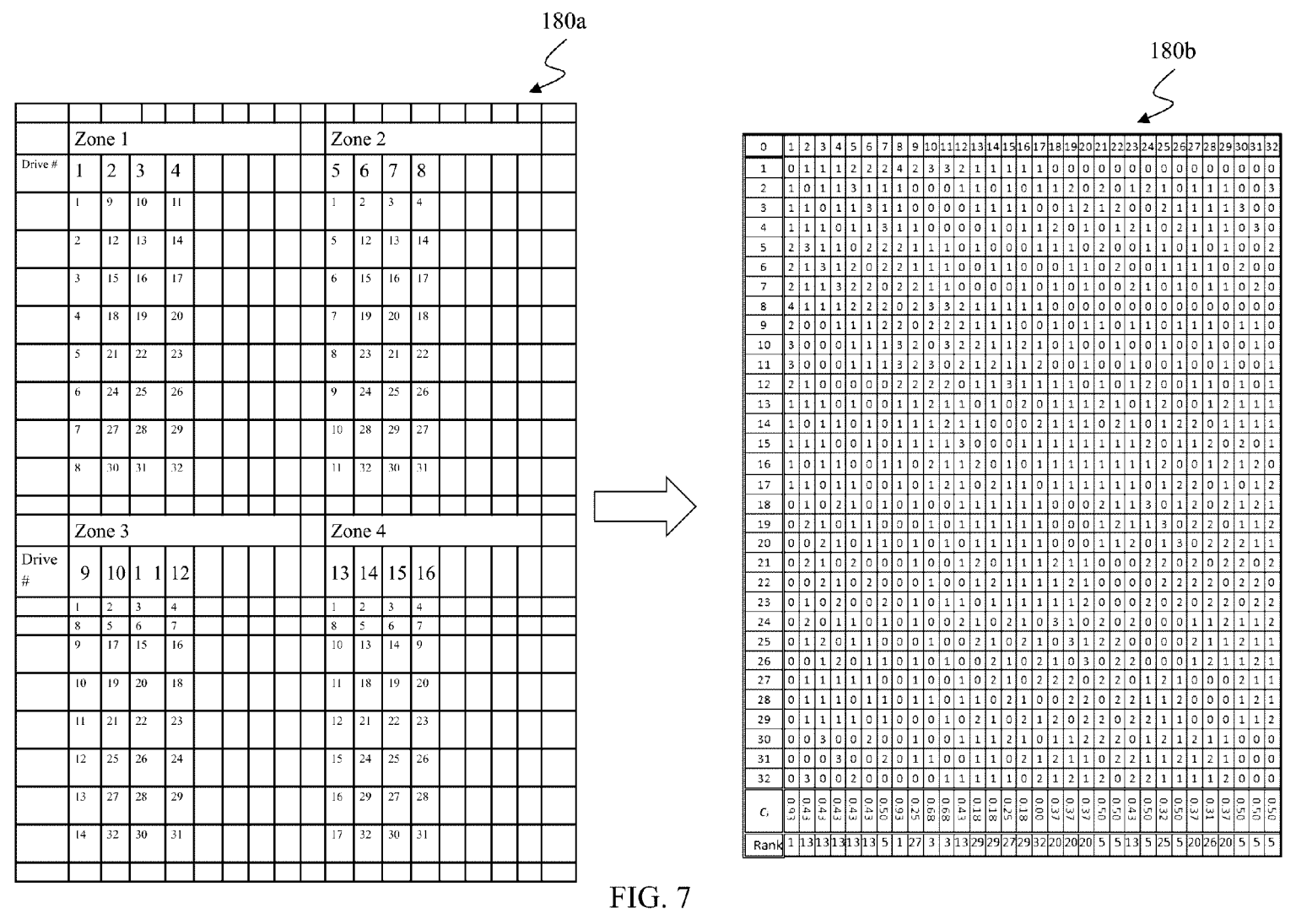

Referring to FIG. 7, a diagram illustrates a configuration map 180a indicating mapping of RAID groups 1-32 onto sections of devices 1-16 and a corresponding RAID collision matrix 180b. The configuration map 180a illustrates a specific embodiment of the system described herein. Construction of a configuration map is disclosed in U.S. patent application Ser. No. 14/231,282 filed on Mar. 31, 2014 and titled "ALLOCATING RAID STORAGE VOLUMES ACROSS A DISTRIBUTED NETWORK OF STORAGE ELEMENTS", incorporated by reference, above. The configuration map 180a contains, in an embodiment illustrated herein, indications of physical location and fault zone information for each physical storage device. The configuration map 180a may be interpreted to determine suitability of assigning a spare section for a given RAID volume in connection with determining if sufficient spare coverage has been achieved. In the configuration map 180a, drives are represented by columns. Rows of the configuration map 180a correspond to sections on the drives, and values in each column identify a particular RAID group located at the corresponding section and drive. The configuration map 180a also shows fault zones in which each of the drives is placed. The fault zones are indicated in this example by a power zone designation (Zone 1, Zone 2, Zone 3 and Zone 4), but may in other embodiments represent any type of fault zone and location within a system. In the example illustrated by FIG. 7, there are thirty-two RAID groups. The configuration map 180a shows the sixteen drives provided in four different zones where each of the drives has eight sections and each section accommodates a member of one of the thirty-two RAID groups.

The top row of the RAID collision matrix 180b lists the different RAID groups, in order, as does the left-most column. For any row and column (i.e., i and j, discussed above), the number in the box indicates a number of times that RAID group i and RAID group j are provided on different sections of the same device (i.e., a collision). The second from bottom row of the RAID collision matrix 180b is a $TCC_i$ value for each RAID group i (discussed above). Note that the values for $TCC_i$ shown in the example of FIG. 7 are normalized and may be determined differently than the formula used in the step 168, described above. The bottom row of the RAID collision matrix 180b shows a ranking, from highest to lowest, for the $TCC_i$ values.

Referring to FIG. 8, a flow diagram 200 illustrates in more detail processing performed at the step 128, discussed above, where it is determined if the system has sufficient coverage such that, if any of the devices fails, all of the effected RAID groups can be reconstructed using available spare sections. Generally, the system determines this by simulating failure of each of the devices of the system one at a time and then confirming (or not) that the RAID groups having members on a simulated failed device can be reconstructed using available spare sections.

Processing begins at a first step 202 where an iteration pointer that iterates through all of the devices of the system is set to point to the first one of the devices. Following the step 202 is a test step 204 where it is determined if the pointer points past the end (i.e., if failure simulation has been performed for all of the devices). If not, then control transfers from the test step 204 to a step 206 where a failure is simulated for the device indicated by the iteration pointer. Following the step 206 is a test step 208 where it is determined if there are available spare sections to allow reconstructing of all RAID groups that would be affected by the device failure that is being simulated. Processing performed at the step 208 is described in more detail elsewhere herein. If there are available spare sections to allow reconstruction, then control transfers from the test step 208 to a step 212 where the iteration pointer that iterates through the devices is incremented (points to next device). Otherwise, control transfers from the test step 208 to a step 214 where a failure indication is returned. That is, if there is no possibility of reconstructing all of the effected RAID groups when one of the devices fails, then the current configuration is unacceptable. Note that, if this happens, the test at the step 128 of the flow diagram 120 of FIG. 5 will determine that there is not sufficient coverage with the configuration and members of another RAID group will be converted to spare sections at the step 132.

Following the step 212, control transfers back to the step 204 for another iteration. Once it is determined at the step 204 that the iteration pointer points past the end of a list of devices (i.e., failure simulation has been performed for all of the devices), then control transfers from the test step 204 to a step 216 where a pass indication is returned, signifying that the system has sufficient coverage such that, if any of the devices fails, all of the effected RAID groups can be reconstructed using available spare sections. This result is returned to the test step 128 of the flow diagram 120 of FIG. 5, signifying that the current configuration (with members of N RAID groups converted to spare sections) provides for sufficient coverage for failure of a device in the system.

Referring to FIG. 9, a flow diagram 230 illustrates in more detail processing performed in connection with the test step 208 of the flow diagram 200 of FIG. 8 where it is determined if there are available spare sections to allow reconstructing of all RAID groups that would be affected by the device failure that is being simulated. Processing begins at a first step 232 where an iteration pointer, used to iterate through all possible combinations of spare deployment, is set to point to a first one of the combinations. Note that, given a finite set of RAID group members that are displaced when a device fails and given a finite set of spare sections, there are a finite number of combinations of placement of the displaced members on the spare sections.

Following the step 232 is a step 234 where it is determined if the iteration pointer points past the end of the list of combinations (i.e., all possible combinations have been tried). If not, then control passes from the test step 234 to a test step 236 where it is determined whether there are acceptable spare sections for RAID members that need to be relocated when a device fails. The test at the step 236 may ensure that no two members from the same RAID group are provided on the same device.

In some embodiments, the test at the step 236 may include other criteria, such as whether a spare used for a displaced member is in a same power zone, the physical address used (to facilitate short-stroking), expected collision levels with other RAID groups, acceptable spare capacity per device, etc. Note that any other appropriate criteria may also be used. Note also that it is possible to suspend (ignore) one or more criteria in appropriate circumstances. For example, if a power zone criteria is causing too many spare sections to be provisioned, the power zone criteria may be suspended.

If it is determined at the step 236 that the current combination indicated by the iteration pointer is not an acceptable selection of spare sections for RAID members that need to be relocated when a device fails, then control transfers from the test step 236 to a step 238 to increment the iteration pointer that iterates through all of the possible combinations of spare deployment. Following the step 238, control transfers back to the step 234 for another iteration. Note that, selection of a next combination can facilitate rapid determination of a result. Instead of randomly traversing all of the combinations, a next combination that is selected for testing may simply swap two of the assignments to spares.

Note that the steps 234, 236, 238 are repeated until either an acceptable deployment is found or all of the combinations have been examined. If it is determined at the step 236 the current combination indicated by the iteration pointer is an acceptable selection of spare sections for RAID members that need to be relocated when a device fails, then control transfers from the test step 236 to a step 242 where an indication is returned indicating that an acceptable combination exists. Following the step 242, processing is complete since all that is needed is a single acceptable combination. Note that it is not necessary to test all possible configurations if one acceptable configuration is found. Thus, the step 242 may be reached long before all of the combinations have been tested.

If it is determined at the step 234 that the iteration counter that iterates through the combinations is past the end of a list of combinations (i.e., all of the combinations have been attempted), then control passes from the test step 234 to a step 244, where a failure indication is returned. If no combination provides an acceptable deployment of RAID members on available spare sections to allow reconstructing of all RAID groups that would be affected by the device failure that is being simulated, then there are not enough spare sections. As discussed elsewhere herein, this may be affected by any criteria/constraint used in connection with deployment of spare sections. Following the step 244, processing is complete.

Referring to FIG. 10, a diagram 260 illustrates using flow theory to determine if a particular configuration of spare sections is acceptable. Using flow theory may be an alternative to the processing illustrated by the flow diagram 230 of FIG. 9. A plurality of nodes 262a-262c represent sections on a device that has failed (or for which failure is being simulated). Each of the nodes 262a-262c represents one of the sections. Similarly, a plurality of other nodes 264a-264c represents each of the spare sections provided on non-failing devices. Each of the nodes 264a-264c represents one of the spare sections. Arrows leaving the nodes 262a-262c and arrows entering the nodes 264a-264c represent flow edges (connections) from at least one of the nodes 262a-262c to at least one of the nodes 264a-264c. An edge is provided from a particular one of the nodes 262a-262c to a particular one of the nodes 264a-264c if and only if a spare section corresponding to a destination one of the nodes 264a-264c can serve as a spare for a RAID group member corresponding to the source one of the nodes 262a-262c given the criteria/constraints used for selecting spare sections. For example, if selection of a particular spare section for a particular RAID group results in two members of the same RAID group on the same device (which is not allowed), then there would be no edge between the corresponding nodes 262a-262c, 264a-264c. Similarly, if it is desirable that a spare section being used to reconstruct a particular RAID group is in a specific power zone, then only edges to the nodes 264a-264c corresponding to spare sections in the specific power zone are provided.

The diagram 260 also shows a source node 266 coupled to all of the nodes 262a-262c and a sink node 268 coupled to all of the nodes 264a-264c. If all of the edges that are provided from the nodes 262a-262c to the nodes 264a-264c are assigned a value of one, then there is an acceptable assignment of spare group sections to RAID group members of a failed device when the maximum value of the flow from the source node 266 to the sink node 268 equals the number of the nodes 262a-262c. The flow from the source node 266 to the sink node 268 can be determined using any appropriate type of flow determination technique, such as the Edmonds-Karp technique or, more generally, the Ford-Fulkerson technique. If the maximum value of the flow equals the number of nodes 262a-262c, then an indication is provided that the spare section configuration is acceptable (similar to the step 242 of the flow diagram 230, discussed above). On the other hand, if the maximum value of the flow is less than the number of nodes 262a-262c, then an indication is provided that the spare section configuration is not acceptable (similar to the step 244 of the flow diagram 230, discussed above).

Note that the system described herein may be extended to test if enough spare sections are provisioned to accommodate two simultaneous device failures. In such a case, the step 206 of the flow diagram 200 of FIG. 8 would be extended to test for different combinations of one and two drive failures. Note also, by the way, that some types of erasure encoding, such as RAID 6, can maintain data integrity even if two members of the RAID group are eliminated at the same time.

In some instances, some of the members of erasure encoding groups may be stored in other storage devices that are external from the device maintaining the erasure encoding groups. For example, if the storage array 24 is maintaining a plurality of RAID groups, at least some of the members of the RAID groups may be stored external to the storage array 24. In some instances, it may be assumed that there are zero collisions for the external members in connection with, for example, constructing the RAID collision matrix 180b.

Various embodiments discussed herein may be combined with each other in appropriate combinations in connection with the system described herein. Additionally, in some instances, the order of steps in the flow diagrams, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of configuring spare sections in a system having a plurality of devices and having a plurality of erasure encoding groups, each of the devices having a plurality of sections and each of the groups having a plurality of members located on the sections of the devices, the method comprising:
   configuring the system to have a plurality of erasure encoding groups with no spare sections;
   ordering the groups according to a total collision count that corresponds to a weighted sum of collision counts between each of the groups and each other ones of the groups;
   converting members of a subset of the groups into spare sections according to ordering of the groups, wherein the spare sections initially contain no data and are used for reconstructing particular erasure coding groups after failure of one or more of the devices corresponding to the particular erasure coding groups; and
   determining if the spare sections for the system provide sufficient coverage for the system in response to failure of each of the devices.

2. A method, according to claim 1, wherein determining if the spare sections provide sufficient coverage includes determining if each of the erasure encoding groups can be reconstructed using the spare sections following a failure of each of the devices.

3. A method, according to claim 1, wherein the weighting function is provided by:

$$w(c_{ij}) = (\max - c_{ij})^2$$

where $c_{ij}$ is a collision count between erasure coding group i and erasure coding group j and max is a maximum value of the collision count for all of the erasure groups.

4. A method, according to claim 3, wherein the total collision count is provided by:

$$TCC_i = \Sigma_{j=1}^{NEG} w(c_{ij}) c_{ij}$$

where NEG is a total number of erasure groups.

5. A method, according to claim 1, wherein ordering the groups includes providing a list of groups in order according to the total collision count.

6. A method, according to claim 1, wherein determining if the spare sections for the system provide sufficient coverage includes simulating failure of each of the devices.

7. A method, according to claim 6, wherein determining if the spare sections for the system provide sufficient coverage includes trying different combinations of spare assignments and, in response to a combination that does not work, choosing a next combination that swaps two of the spare assignments.

8. A method, according to claim 6, wherein determining if the spare sections for the system provide sufficient coverage includes using an Edmonds-Karp technique.

9. A method, according to claim 1, wherein the erasure coding is RAID erasure coding.

10. A non-transitory computer-readable medium containing software that configures spare sections in a system having a plurality of devices and having a plurality of erasure encoding groups, each of the devices having a plurality of sections and each of the groups having a plurality of members located on the sections of the devices, the software comprising:
    executable code that configures the system to have a plurality of erasure encoding groups with no spare sections;
    executable code that orders the groups according to a total collision count that corresponds to a weighted sum of collision counts between each of the groups and each other ones of the groups;
    executable code that converts members of a subset of the groups into spare sections according to ordering of the groups, wherein the spare sections initially contain no data and are used for reconstructing particular erasure coding groups after failure of one or more of the devices corresponding to the particular erasure coding groups; and
    executable code that determines if the spare sections for the system provide sufficient coverage for the system in response to failure of each of the devices.

11. A non-transitory computer-readable medium, according to claim 10, wherein executable code that determines if the spare sections provide sufficient coverage determines if each of the erasure encoding groups can be reconstructed using the spare sections following a failure of each of the devices.

12. A non-transitory computer-readable medium, according to claim 10, wherein the weighting function is provided by:

$$w(c_{ij}) = (\max - c_{ij})^2$$

where $c_{ij}$ is a collision count between erasure coding group i and erasure coding group j and max is a maximum value of the collision count for all of the erasure groups.

13. A non-transitory computer-readable medium, according to claim 12, wherein the total collision count is provided by:

$$TCC_i = \Sigma_{j=1}^{NEG} w(c_{ij}) c_{ij}$$

where NEG is a total number of erasure groups.

14. A non-transitory computer-readable medium, according to claim 10, wherein executable code that orders the groups provides a list of groups in order according to the total collision count.

15. A non-transitory computer-readable medium, according to claim 10, wherein executable code that determines if the spare sections for the system provide sufficient coverage simulates failure of each of the devices.

16. A non-transitory computer-readable medium, according to claim 15, wherein executable code that determines if the spare sections for the system provide sufficient coverage tries different combinations of spare assignments and, in response to a combination that does not work, chooses a next combination that swaps two of the spare assignments.

17. A non-transitory computer-readable medium, according to claim 15, wherein executable code that determines if the spare sections for the system provide sufficient coverage uses an Edmonds-Karp technique.

18. A non-transitory computer-readable medium, according to claim 10, wherein the erasure coding is RAID erasure coding.

* * * * *